US 6,584,835 B2

(12) United States Patent
Jenniges et al.

(10) Patent No.: US 6,584,835 B2
(45) Date of Patent: Jul. 1, 2003

(54) SPINDLE ASSEMBLY FOR A TIRE OR WHEEL TESTING MACHINE

(75) Inventors: Randal L. Jenniges, Bloomington, MN (US); Steven J. Sattler, Eden Prairie, MN (US)

(73) Assignee: MTS Systems Corporation, Eden Prairie, MN (US)

(*) Notice: Subject to any disclaimer, the term of this patent is extended or adjusted under 35 U.S.C. 154(b) by 3 days.

(21) Appl. No.: 09/780,030

(22) Filed: Feb. 9, 2001

(65) Prior Publication Data

US 2001/0032499 A1 Oct. 25, 2001

Related U.S. Application Data

(60) Provisional application No. 60/181,868, filed on Feb. 11, 2000.

(51) Int. Cl.$^7$ .............................................. G01M 17/02
(52) U.S. Cl. ....................................................... 73/146
(58) Field of Search ............................. 73/146–146.8, 73/128, 129, 130, 462; 152/213; 360/98, 99, 97; 156/379; 310/90

(56) References Cited

U.S. PATENT DOCUMENTS

| | | | |
|---|---|---|---|
| 3,520,180 A | 7/1970 | Polhemus et al. ............ 73/71.7 |
| 3,797,306 A | 3/1974 | Petersen et al. .............. 73/146 |
| 3,895,518 A | 7/1975 | Leblond ....................... 73/146 |
| 3,977,243 A | 8/1976 | Yamada et al. ............... 73/146 |
| 3,987,672 A | * 10/1976 | Loyer .......................... 73/146 |
| 4,023,426 A | 5/1977 | Duryea, Jr. .................. 74/241 |
| 4,344,324 A | 8/1982 | Langer ........................ 73/146 |
| 4,576,040 A | * 3/1986 | Cargould ..................... 73/146 |
| 5,481,907 A | * 1/1996 | Chasco et al. ............... 73/146 |
| 5,918,255 A | * 6/1999 | Dutka et al. ................ 73/1.84 |
| 6,308,566 B1 | * 10/2001 | Matsumoto et al. .......... 73/462 |

FOREIGN PATENT DOCUMENTS

DE  40 01 690 A1  8/1990

OTHER PUBLICATIONS

MTS Systems Corporation Brochure "Introducing Flat–Trac© III The Next Logical Step in Tire Testing4", 2/96 and accompanying FIGS. 1–3.

* cited by examiner

Primary Examiner—Hezron Williams
Assistant Examiner—Marissa L Ferguson
(74) Attorney, Agent, or Firm—Westman, Champlin & Kelly, P.A.; Steven Koehler

(57) ABSTRACT

A tire and/or wheel testing machine and method for operating the same allows testing without removal of a drive motor that is only used during some of the tests. One aspect is a testing machine wherein the drive motor is supported by a support member so that the motor axis intersects with a spindle plane having the spindle axis. Another aspect includes a coupling assembly allowing selective decoupling of the motor shaft with the spindle hub.

29 Claims, 12 Drawing Sheets

SPINDLE ASSEMBLY FOR A TIRE OR WHEEL TESTING MACHINE

CROSS-REFERENCE TO RELATED APPLICATION

This application claims the benefit of U.S. provisional patent application Ser. No. 60/181,868, filed Feb. 11, 2000, the content of which is hereby incorporated by reference.

BACKGROUND OF THE INVENTION

The present invention relates to tire or wheel testing machines. More particularly the present invention relates to a spindle assembly for a tire or wheel testing machine.

In the prior art various tire and wheel testing machines have been advanced. One type of machine includes rolling a tire on a revolving surface such as a drum. Another form of testing machine utilizes a flat belt that is mounted on drums or pulleys. In either form, the revolving surface is typically power driven. The tire and wheel assembly can be raised and lowered with respect to the revolving surface, and thus loaded, while the tire and wheel assembly is adjusted for camber and moved to simulate steering action.

In many machines, a separate driving device is provided for the revolving surface and for the tire and wheel assembly in order to conduct different types of tests. For instance, both of the driving devices can be operated in order to conduct a slippage test with a known amount of slip between the tire and the revolving surface. In yet another test, the revolving surface is driven so as to drive the tire and wheel assembly. During this test, the driving device for the tire and wheel assembly is not operated, and in many instances, is removed in order to reduce rolling resistance and reduce mass in order to allow rapid changes in steer position. The drive device for the tire and wheel assembly is commonly supported by the same spindle used for the tire and wheel assembly. Thus, by removing the drive device, the inertia of the spindle assembly about a steer axis is reduced. Removal of the drive device for the tire and wheel assembly, however, is time consuming.

There thus is a continuing need for an improved spindle assembly that does not require removal of the tire and wheel drive device in order to perform required tests.

SUMMARY OF THE INVENTION

A tire and/or wheel testing machine and method for operating the same allows testing without removal of a drive motor that is only used during some of the tests. One aspect is a testing machine wherein the drive motor is supported by a support member so that the motor axis intersects with a spindle plane having the spindle axis.

Another aspect includes a coupling assembly allowing selective decoupling of the motor shaft with the spindle hub. In particular, a fastener selectively decouples the motor shaft from the spindle hub to allow free rotation of the spindle hub while the drive motor is mounted to the support member.

DETAILED DESCRIPTION OF THE ILLUSTRATIVE EMBODIMENTS

Figure 1:
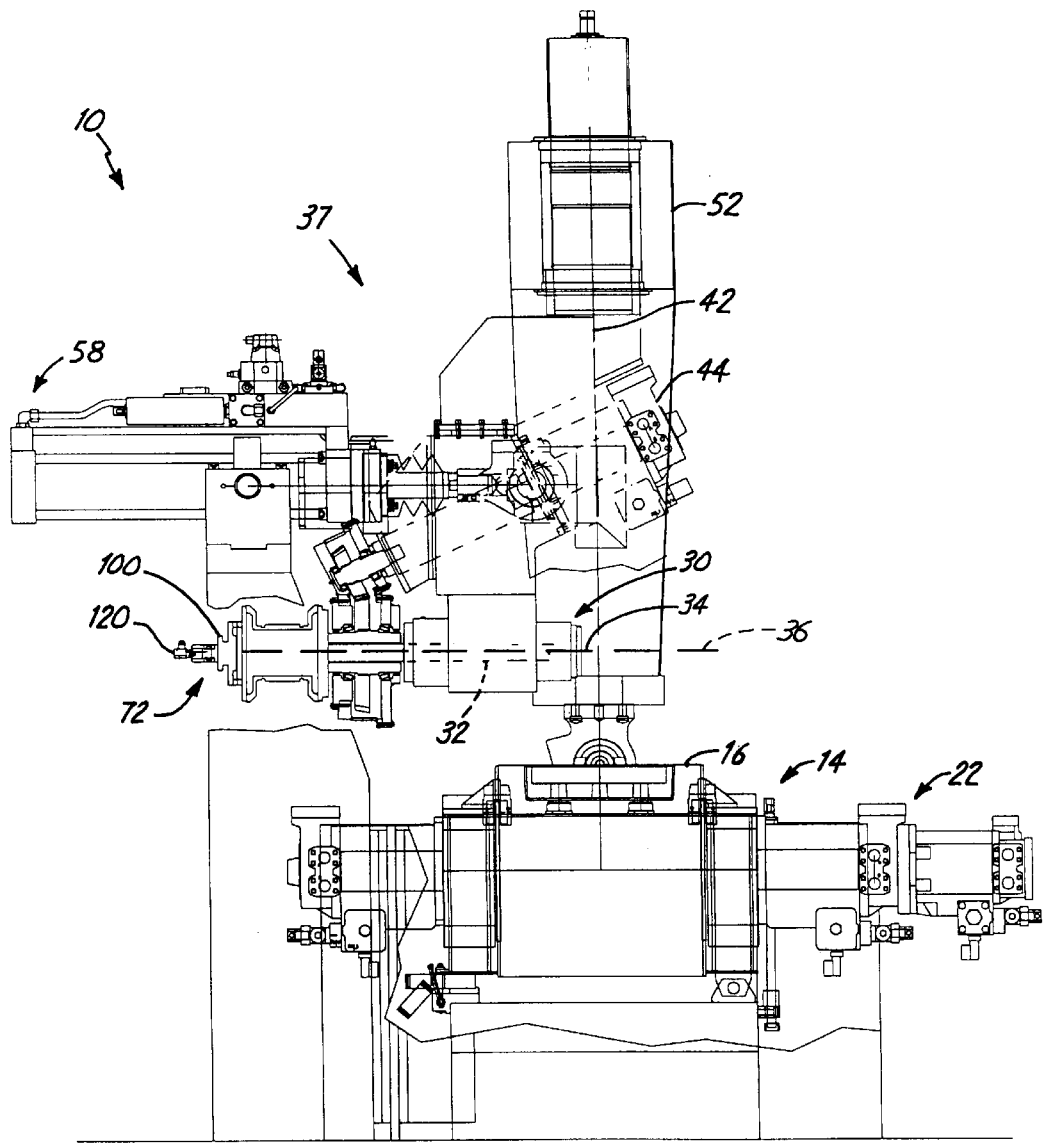
FIG. 1 is a side elevational view of a first embodiment of a testing machine with portions removed.
Figure 2:
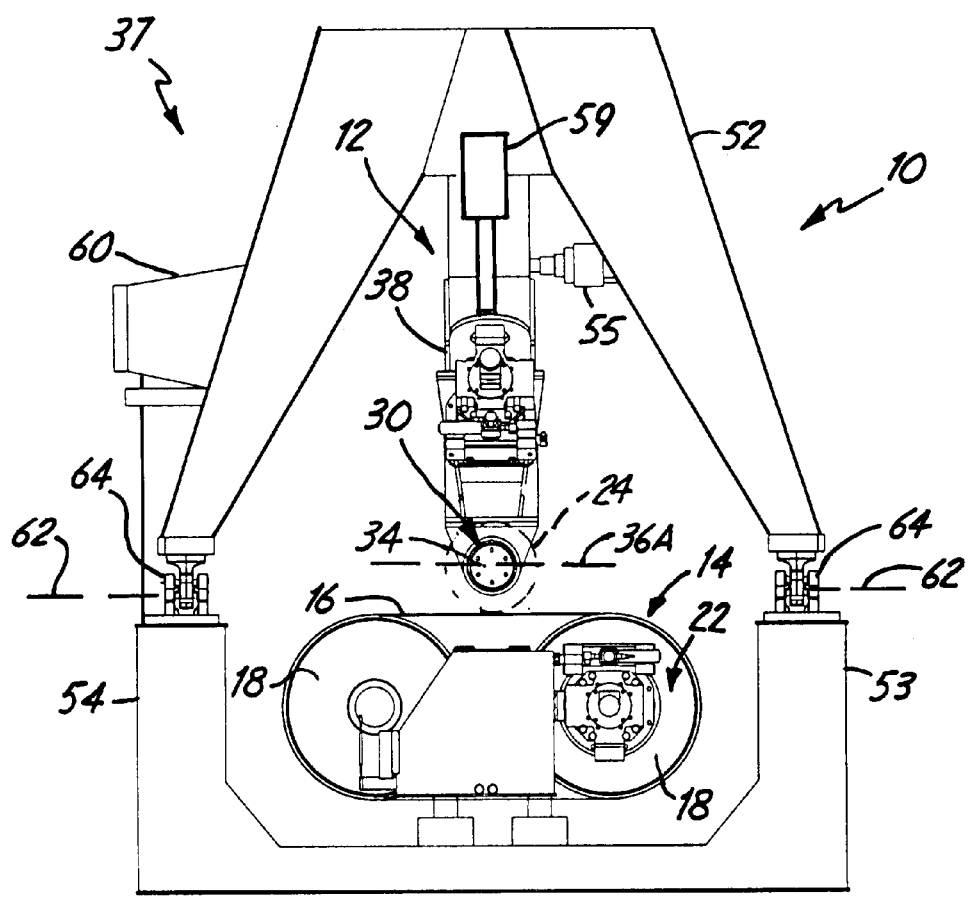
FIG. 2 is a front elevational view of the testing machine.

A first exemplary embodiment of a tire and wheel testing machine 10 including a spindle drive assembly 12 of the present invention is generally illustrated in FIGS. 1 and 2. The testing machine 10 includes a road surface simulator 14 comprising an endless belt 16 that forms a revolving surface. The endless belt 16 is supported on and rotates about a pair of drums or rollers 18. A drive assembly 22 drives the endless belt 16. It should be noted that the road surface simulator 14 does not form part of the present invention, but rather, is provided as an exemplary form of a revolving surface that engages a tire and wheel assembly 24 under test. As appreciated by those skilled in the art, other forms of revolving surfaces such as a rotatable drum can be used in place of the roadway simulator 14 herein illustrated.

Figure 3:
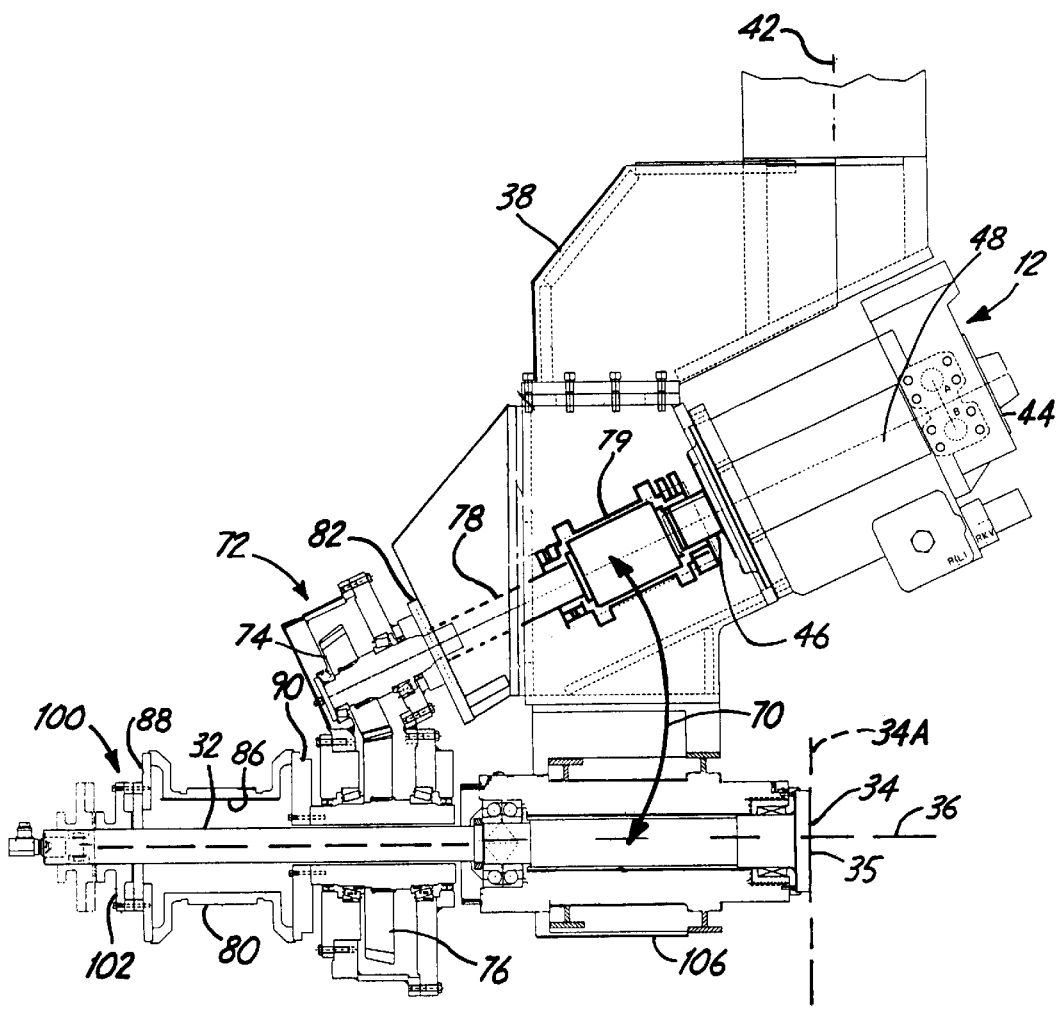
FIG. 3 is side elevational view of a first embodiment of a spindle drive assembly with portions removed.

Referring also to FIG. 3, the spindle drive assembly 12 includes a spindle 30 having a spindle shaft 32 joined to a spindle hub 34. The spindle hub 34 is adapted to support the tire and wheel assembly 24 for rotation about a spindle axis 36. The spindle drive assembly 12 further includes a support member 38 movably joined to a frame 37 to pivot the spindle 30 about an steer axis 42 that is typically positioned perpendicular to the spindle axis 36. A drive motor 44 rotates the tire and wheel assembly 24 about the spindle axis 36. The drive motor 44 includes an output shaft 46 rotatable about a motor axis 48. The output shaft 46 is operably coupled to the spindle shaft 32. As a first aspect of the present invention, the drive motor 44 is supported by the support member 38 so that the motor axis 48 intersects with a spindle plane 36A having the spindle axis 36 that is perpendicular to a hub plane 34A defined by a mounting surface 35 of the hub 34. By orienting the drive motor 44 in this manner, the drive motor 44 is positioned closer to the steer axis 42 thereby minimizing inertia of the spindle drive assembly 12 for rotation about the steer axis 42. In the embodiment illustrated, the frame 37 includes a frame member 52 that is pivotally mounted with respect to legs 53 and 54. In this embodiment, the spindle drive assembly 12 is pivotally mounted to the frame member 52 for pivotal motion about the steer axis 42. The actuating device to cause pivotal motion can be a rotary actuator disposed on the spindle axis 42, or a linear actuator 55, as shown, operably coupled to the spindle drive assembly 12 and the frame member 52. An actuator 59 coupled between spindle drive assembly 12 and frame member 57 can also be provided to displace the spindle drive assembly 12 along axis 42.

In the embodiment illustrated, the frame member 52 pivots with respect to the legs 53 and 54 in order to adjust the camber of the tire and wheel assembly 24 with respect to the road surface simulator 14. An actuating device 58 coupled to the frame member 52 and a support strut 60 of the legs 53 and 54 causes displacement of the frame member 52 and spindle drive assembly 12 about a camber axis 62 extending through pivotal connections 64. Orientation of the drive motor 44 on the support member 38 in the manner described above also reduces the inertia of the spindle drive assembly 12 about the camber axis 62.

It should also be noted that the construction of the frame member 52, its pivotal connection to legs 53 and 54 and the means for pivoting the spindle drive assembly about the steer axis 42 and about the camber axis 62 pertaining to exemplary embodiment and should not be considered limiting. The actuating devices 55, 58 and 59 can take many forms including mechanical assemblies utilizing gears and/or electric, hydraulic or pneumatic actuators.

Figure 5:
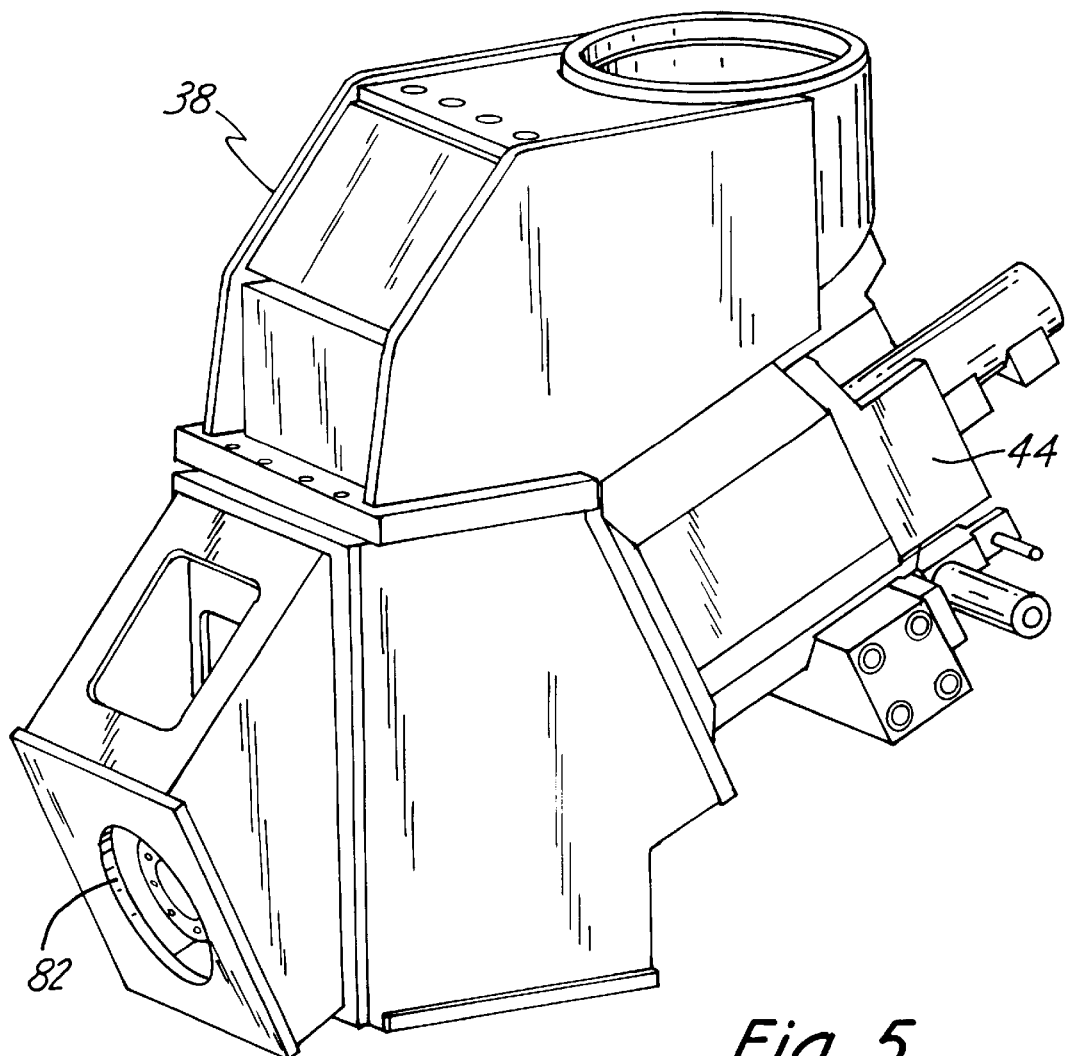
FIG. 5 is a perspective view of the spindle drive assembly of FIG. 3 with some components removed.
Figure 6:
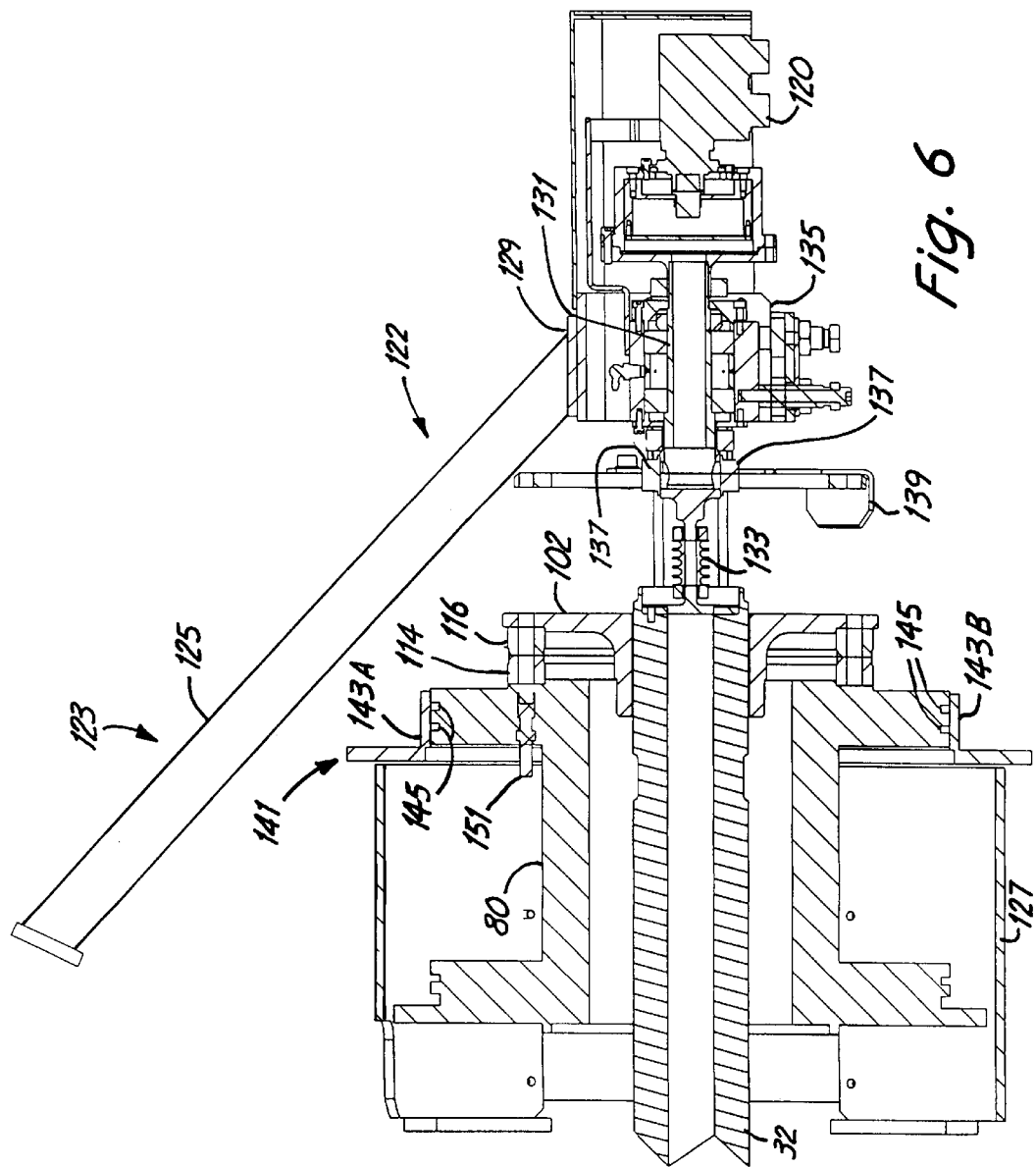
FIG. 6 is an enlarged sectional view of a restraint assembly and a coupling hub in a coupled position.

FIG. 3 is a side elevational view of a first embodiment of the spindle drive assembly 12 with portions removed. In this embodiment, the drive motor 44 is oriented so as to form an acute angle 70 between the motor axis 48 and the spindle axis 36. A coupling assembly 72 couples the output shaft 46 to the spindle shaft 32. In this embodiment, the coupling assembly 72 includes mating gears 74 and 76. Gear 74 is coupled to a drive shaft 78 that in turn is coupled to the output shaft 46 of the drive motor 44. Gear 76 is coupled to spindle shaft 32, preferably, through a torque cell 80, discussed below. Orientation of the drive motor 44 as illustrated reduces the inertia of the drive spindle assembly 12 since a considerable amount of mass is disposed proximate the steer axis 42. In the particular embodiment illustrated, the hub plane 34A and/or the steer axis 42 extend through the drive motor 44, which is typically a high mass component of the spindle drive assembly 12. Thus, by locating at least some of the mass of the drive motor 44 on the opposite side of the hub plane 34A and/or the steer axis 42, while other components of the drive motor assembly 12 such as the support member 38 and the coupling assembly 72 remain on the other side of the hub plane 34A and/or the steer axis 42, the inertia of the drive spindle assembly 12 is reduced. Preferably, the drive shaft 78 includes a double flexible coupling 79. The drive mechanism from the motor 44 extends through an aperture or bore 82 (FIG. 5) in the support member 38 to provide a compact assembly.

A second aspect of the present invention includes the coupling assembly 72 that allows the output shaft 46 of the motor 44 to be selectively decoupled from the hub 34 to allow free rotation of the hub 34, while the drive motor 44 remains mounted to the support member 38. As discussed above, the gear 76 drives the torque cell 80. The torque cell 80 drives the spindle shaft 32. However, in order to realize a more compact assembly, in a preferred embodiment, the spindle shaft 32 extends through the gear 76 and a bore 86 of the torque cell 80 such that a distal end of the spindle shaft 32 remote from the hub 34 is coupled to the torque cell 80 at an end 88. Thus, while the output shaft 46 of the motor 44 is operably coupled to an end 90 of the torque cell 80, the spindle shaft 32 extends through the torque cell 80 and is coupled to the end 88 of the torque cell 80. In this aspect of the present invention, a fastener 100 is provided to selectively decouple two successive components of the drive train from the drive motor 44 to the hub 34. In the embodiment illustrated, the fastener 100 selectively decouples the spindle shaft 32 from the end 88 of the torque cell 80. In this manner, the spindle shaft 32 can freely rotate with respect to the torque cell 80 and the gears 74 and 76 when the fastener 100 is decoupled. The fastener 100 can comprise a disconnect hub 102 joined to the torque cell 80 with a plurality of bolts. Other suitable fastening devices include a spindle nut, tapered joint, or other techniques for transmitting torque in a disconnectable manner. In this embodiment, the spindle shaft 32 is supported by bearings in a load cell 106. Part of the reason for the drive shaft design as illustrated is to isolate the load cell 106 from force inputs from the spindle drive on the spindle shaft 32. The load cell 106 is commonly provided to measure forces and/or moments on the tire and wheel assembly 24 during testing. However, the load cell 106 does not form part of the present invention.

Figure 4:
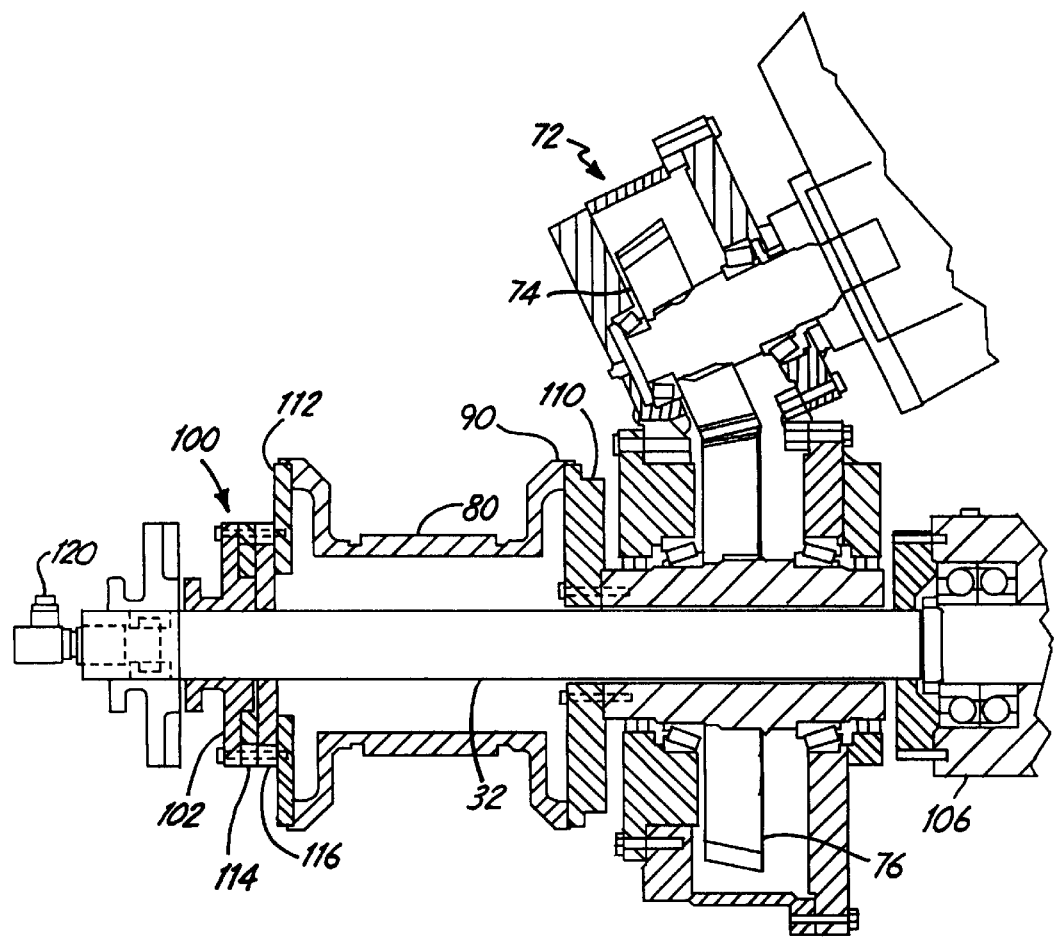
FIG. 4 is an enlarged view of a portion of FIG. 3.

FIG. 4 is an enlarged sectional view of the coupling assembly 72, torque cell 80 and fastener 100. Referring back to gear 76, the gear 76 is fastened to a flexible plate member 110, which in turn, is fastened to end 90 of torque cell 80. A flexible plate member 112 is fastened to end 90 of torque cell 80. Fastener 100 is selectively coupled to plate member 112. If desired, coupling discs 114 and 116 include mating teeth on opposed major surfaces so as to improve the driving connection formed between the fastener 100 and the torque cell 80. A spline connection can be formed between the fastener 100 and the spindle shaft 32. FIGS. 3 and 4 schematically illustrate the fastener 100 also in a decoupled position with dashed lines.

A slip ring/encoder 120 can be operably coupled to the torque cell 80 and the spindle shaft 32, respectively, as known in the art to obtain a signal proportional to torque, position and velocity of the spindle shaft 32.

FIGS. 6, 7, 8 and 9 illustrate a restraint assembly 122 that also substantially supports the slip ring/encoder 120. The restraint assembly 122 includes a support frame 123 attached to the support member 38. The support frame 123 includes support arms 125 and a shield 127. The support arms 125 and shield 127 are both secured to a housing 129 of the slip ring/encoder 120. The shield 127 encloses the torque cell 80.

The restraint assembly 122 supports a shaft 131 that is coupled to shaft 32 with a flexible coupling 133 at a first end and to the slip ring/encoder 120 at a second end. An x, y, z positioning assembly 135 includes bearings that rotatably support the shaft 131. The x, y, z positioning assembly 135 is used to position shaft 131 with respect to shaft 32 so to align it therewith. The shaft 131 is hollow so as to provide electrical conductors to the slip ring/encoder 120. Connectors 137 are provided on an outside surface.

Figure 7:
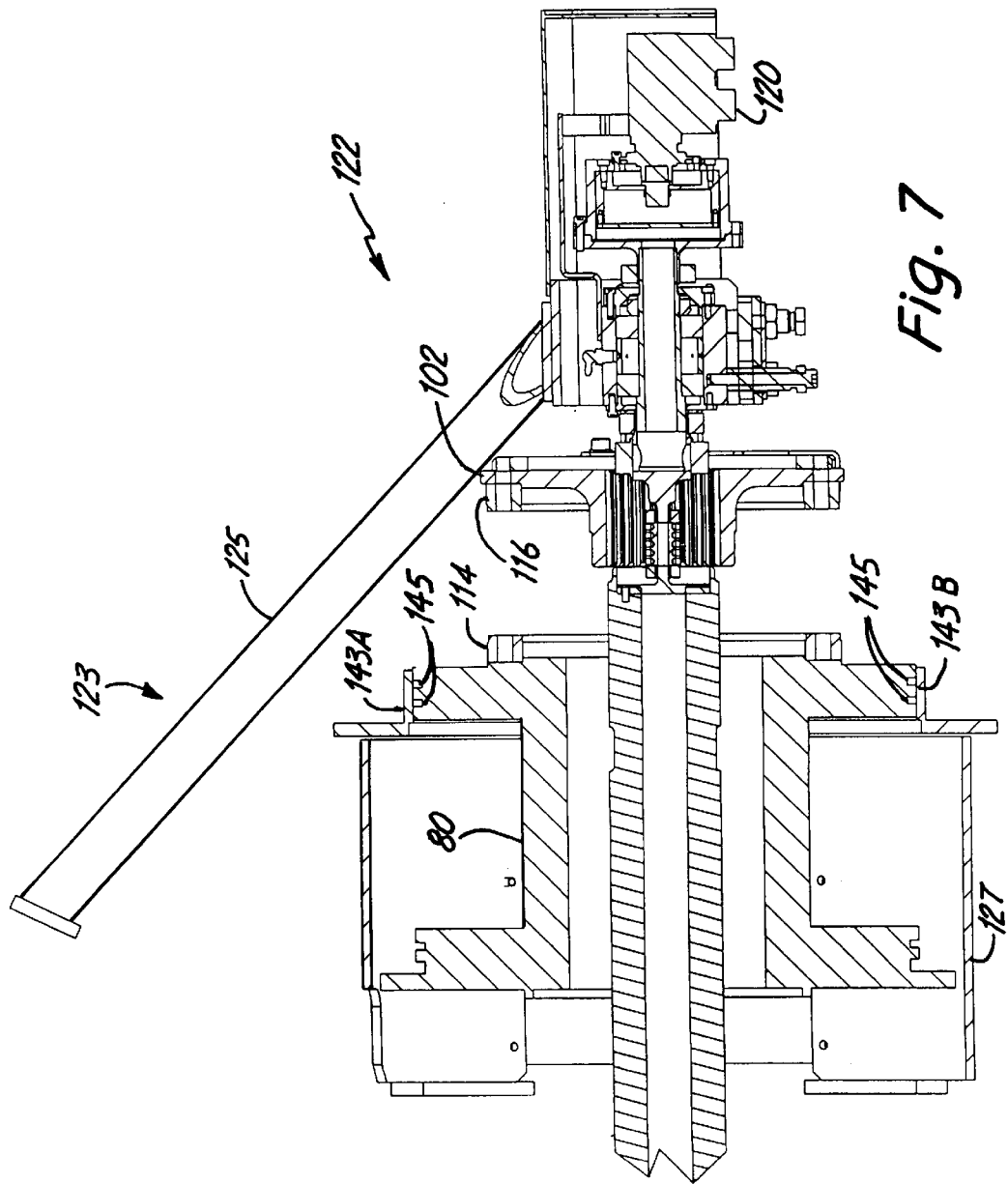
FIG. 7 is an enlarged sectional view of the restraint assembly and the coupling hub in a decoupled position.

In this embodiment, the disconnect or coupling hub 102 can be secured to a support bracket 139 of restraint assembly 122 when decoupled from plate 114 as illustrated in FIG. 7. In comparison with FIG. 3 or 4, the flexible coupling 133 shortens the shaft 32, which can reduce vibrations at high speeds.

Figure 8:
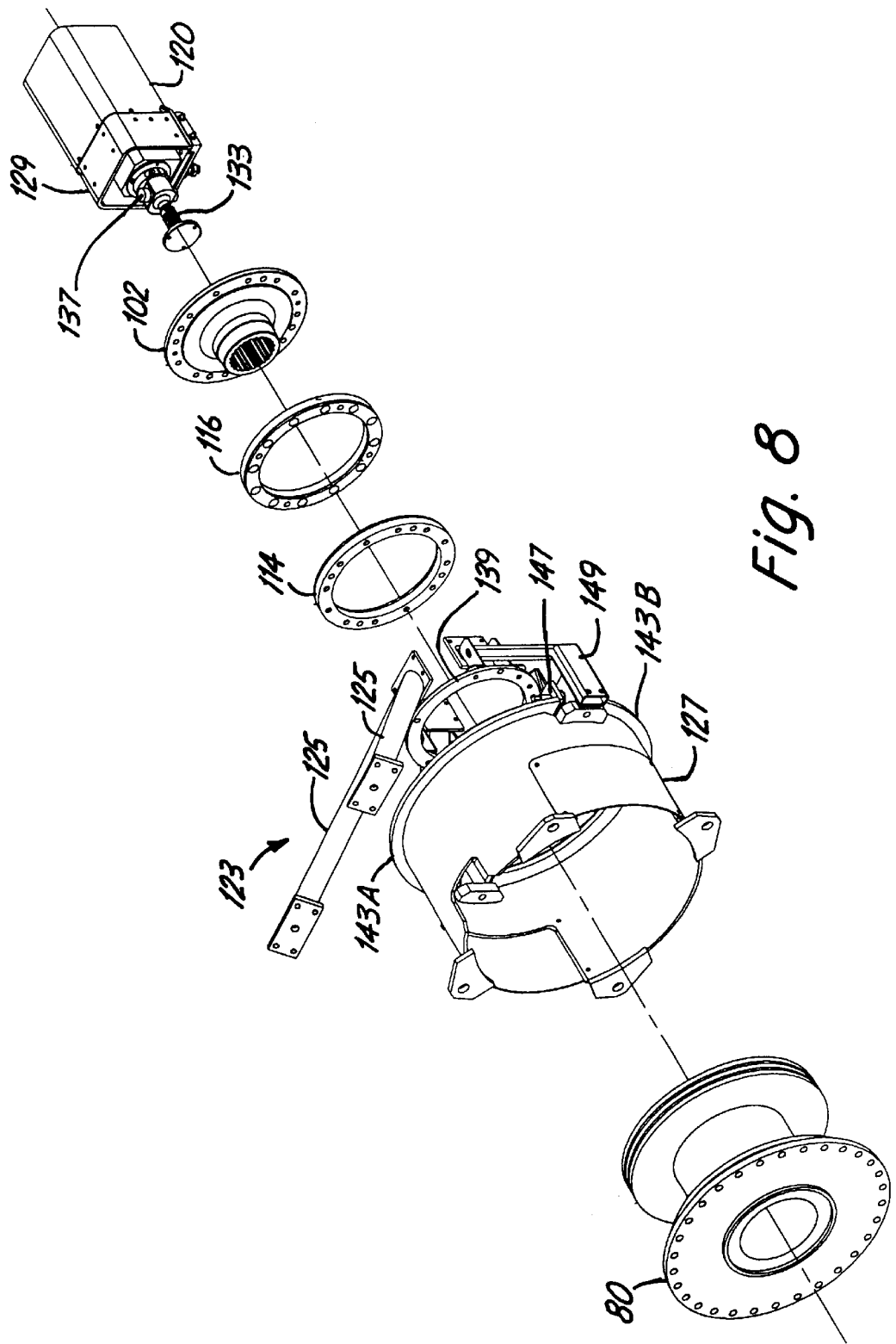
FIG. 8 is an exploded, perspective view of the restraint assembly.
Figure 9:
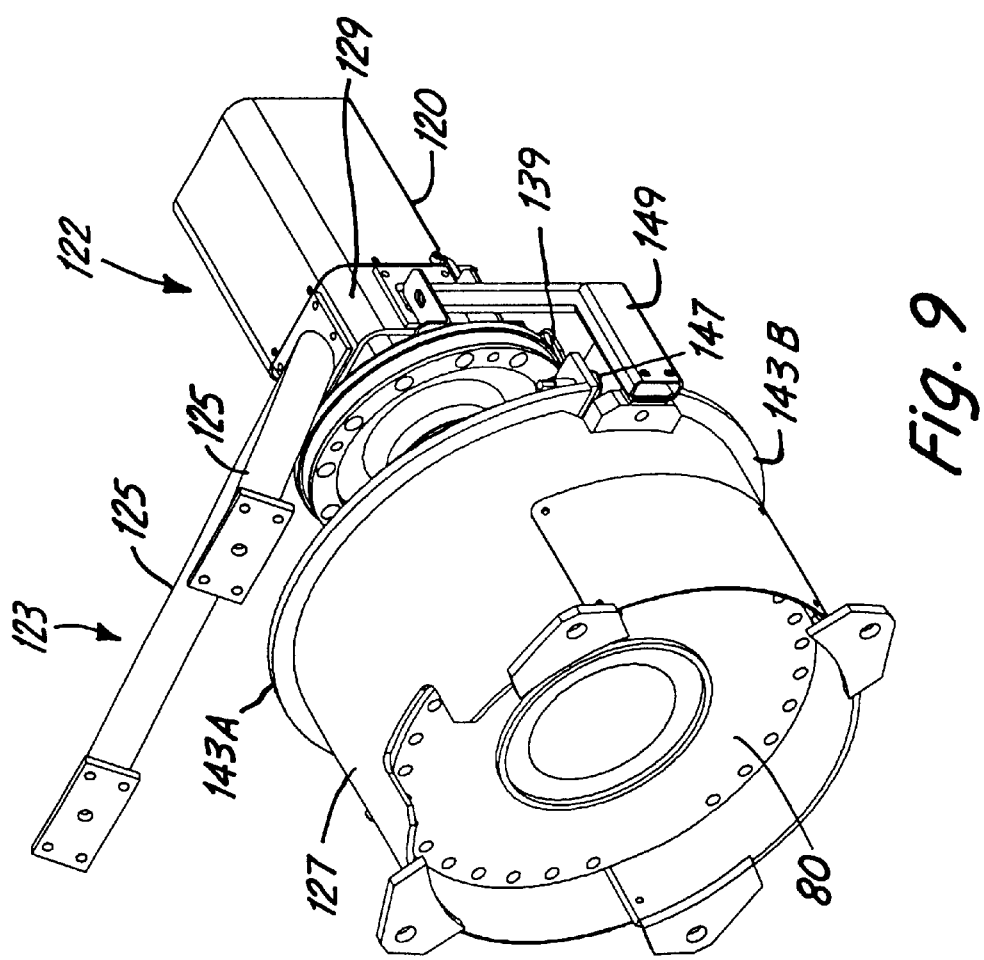
FIG. 9 is a perspective view of the restraint assembly.
Figure 11:
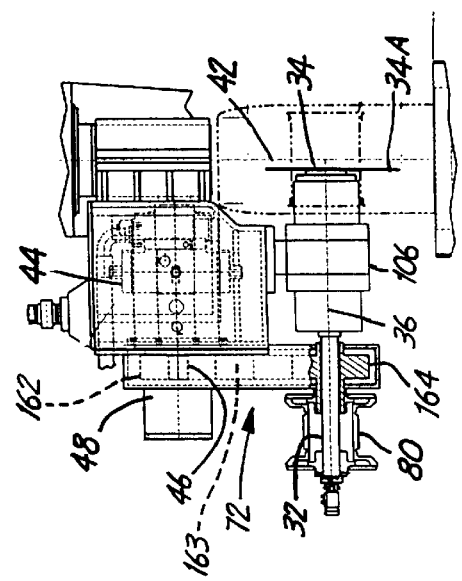
FIG. 11 is side elevational view of a second embodiment of a spindle drive assembly with portions removed.
Figure 10:
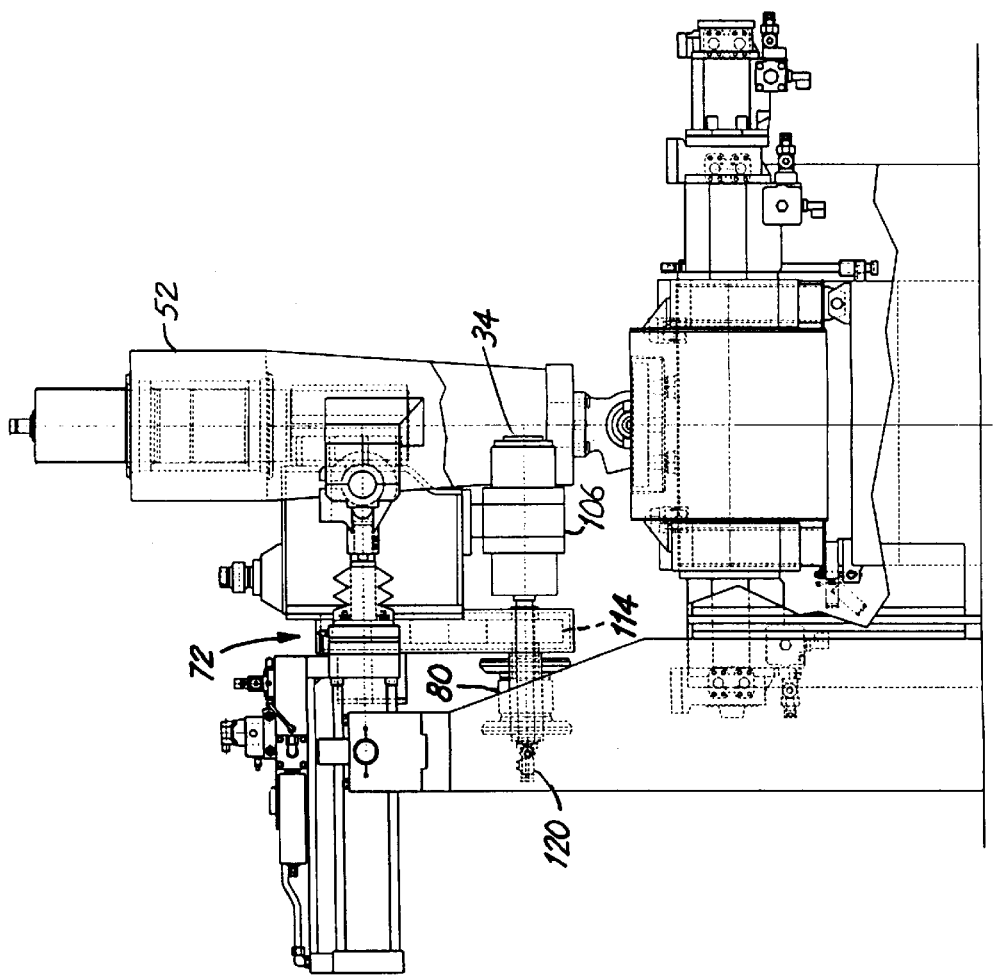
FIG. 10 is a side elevational view of a second embodiment of a testing machine with portions removed.
Figure 12:
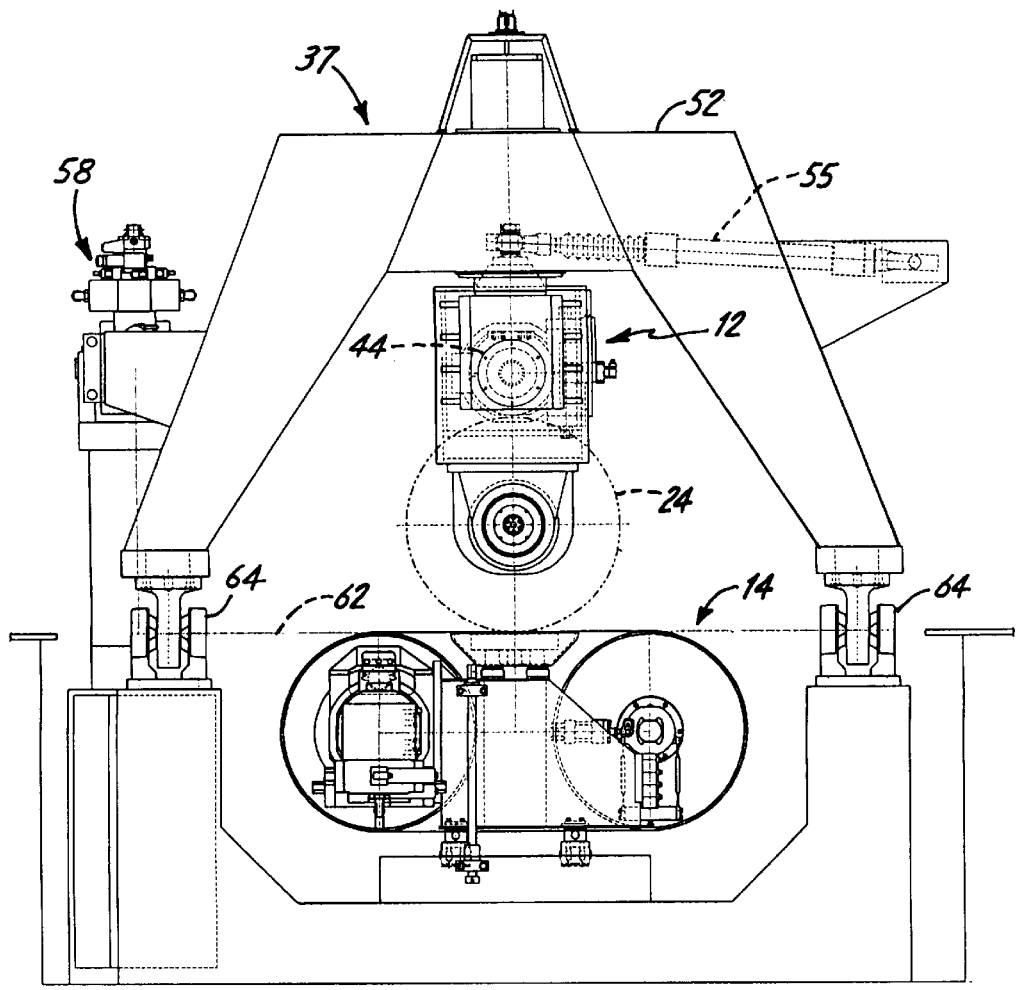
FIG. 12 is a front elevational view of the testing machine of FIG. 10.
Figure 13:
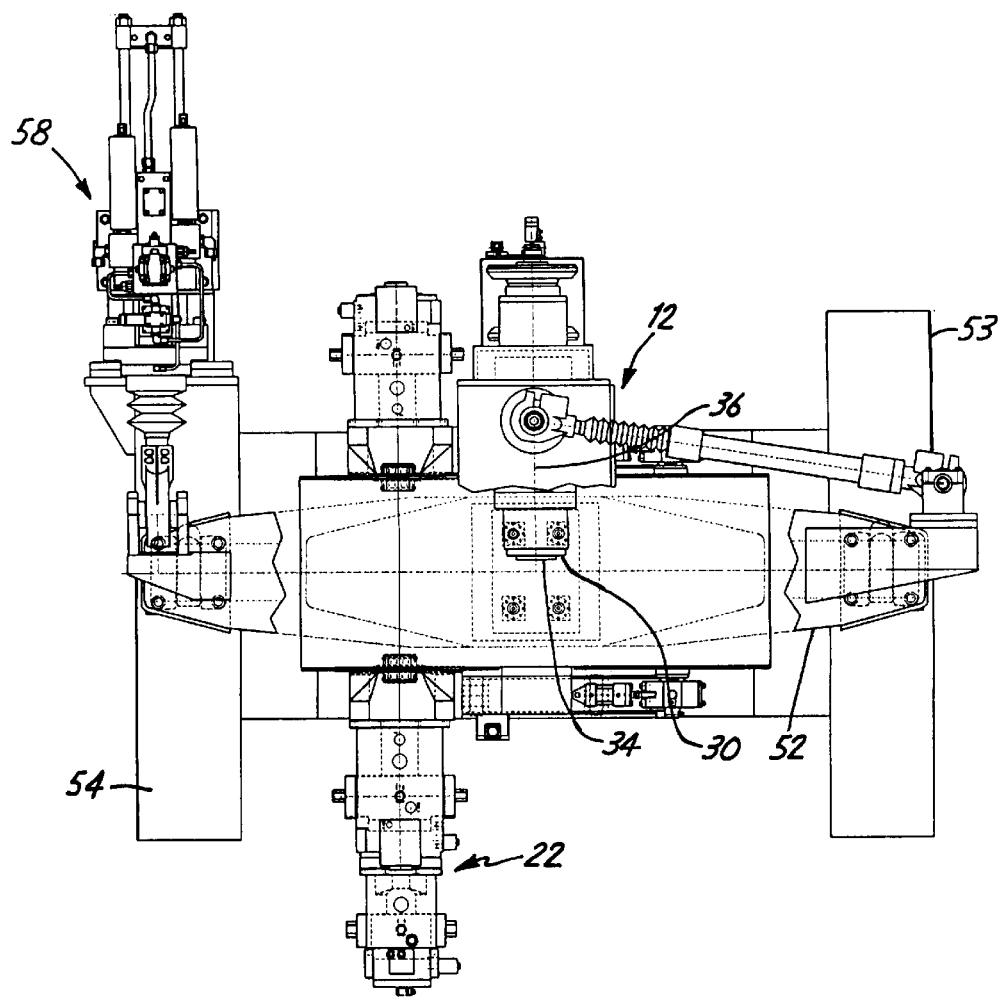
FIG. 13 is a top elevational view of the testing machine of FIG. 10.

In the decoupled position of FIG. 7, the plate 114 and corresponding end of the torque cell 80 are suspended. In a further embodiment, a securing device 141 is provided. In the embodiment illustrated, the securing device comprises a clamp, herein a split ring assembly having portions 143A and 143B. Portions 143A and 143B engage circumferential grooves 145 provided in the torque cell 80. As illustrated in FIGS. 8 and 9, fasteners 147 (one of which is shown, the other fastener being located on the other side) selectively secure the portions 143A and 143B together and to support brackets 149 of the support frame 123.

In the embodiment illustrated, a proximity sensor 151 (FIG. 6) senses when a fastener is present for hub 102. The sensor 151 thereby provides a signal as to when the coupling assembly 72 is in a coupled position. Electrical conductors from the sensor 151 and torque cell 80 (i.e. sensing devices secured to torque cell 80 to measure torque) are provided to connectors 137.

Although illustrated wherein the spindle shaft 32 is selectively decoupled from the torque cell 80, other positions of the fastener can be used. For instance, the fastener can selectively decouple the second gear 76 from the torque cell 80 adjacent end 90. In yet another embodiment, the fastener can selectively decouple the gear 74 from the drive shaft 78, or the drive shaft 78 from the output shaft 46, or the spindle shaft 32 from the hub 34.

It should be noted that selectively decoupling hub 34 from the drive motor 44 is not limited to the embodiment illustrated in FIGS. 1–5. FIGS. 10–13 illustrate a second embodiment wherein the drive motor 44 is mounted to the support member 38 such that the motor axis 48 is vectorially 180 degrees away from the spindle axis 36 (i.e. an end of the output shaft 46 to which the coupling assembly 72 is attached faces in a direction opposite to that of the hub 34). In this embodiment, the coupling assembly 72 can be mating gears 162, 163 and 164, as illustrated, or include an endless member such as a drive belt or chain. Like the embodiment illustrated in FIGS. 1–5, the spindle shaft 32 extends through the drive member 164 (gear, sprocket, or pulley) of the coupling assembly 72, and also extends through the torque cell 80. As appreciated by those skilled in the art, the drive motor 44 can also be oriented vertically so as to be substantially parallel to the steer axis 42 (or obtusely oriented to the steer axis 42) with the spindle shaft 32 again extending through the drive member 164 and the torque cell 80.

Although the present invention has been described with reference to preferred embodiments, workers skilled in the art will recognize that changes may be made in form and detail without departing from the spirit and scope of the invention.

What is claimed is:

1. A spindle drive assembly for a tire or wheel testing machine having a frame, the spindle drive assembly comprising:
   a spindle having a spindle shaft joined to a spindle hub, the spindle hub being adapted to support a wheel for rotation about a spindle axis;
   a support member movably joined to the frame to pivot the spindle about an axis substantially perpendicular to the spindle axis; and
   a drive not mounted to the support member to move therewith and adapted to rotate the wheel about the spindle axis, the drive motor having an output shaft rotatable about a motor axis, the output shaft being operably coupled to the spindle shaft, and wherein the drive motor is supported by the support member so that the motor axis forms an angle with a spindle plane having the spindle axis that is perpendicular to a hub plane defined by the spindle hub, wherein the angle is one of acute, perpendicular or obtuse.

2. The spindle drive assembly of claim 1 wherein the support member supports the motor so that the motor axis and the spindle plane form an acute angle.

3. The spindle drive assembly of claim 1 wherein a portion of the motor intersects with the steer axis.

4. The spindle drive assembly of claim 1 and further comprising a coupling assembly coupling the motor shaft to the spindle shaft.

5. The spindle drive assembly of claim 4 wherein the coupling assembly includes a torque cell having a bore, and wherein the spindle shaft extends through the bore such that a distal end of the spindle shaft remote from the spindle hub is joined to a first end of the torque cell, and wherein a second end of the torque cell is operably coupled to the drive motor.

6. The spindle drive assembly of claim 5 wherein the coupling assembly includes a fastener for selectively decoupling the output shaft from the spindle shaft.

7. The spindle drive assembly of claim 6 wherein the fastener decouples the torque cell.

8. The spindle drive assembly of claim 7 wherein the fastener decouples the spindle shaft from the torque cell.

9. The spindle drive assembly of claim 6 wherein the support member supports the motor so that the motor axis and the spindle plane form an acute angle.

10. The spindle drive assembly of claim 6 wherein the support member supports the motor so that the motor axis and the spindle plane are perpendicular.

11. The spindle drive assembly of claim 1 wherein the axis is a steer axis for the tire and wheel assembly.

12. The spindle drive assembly of claim 1 wherein the axis is a camber axis for the tire and wheel assembly.

13. A spindle drive assembly for a tire or wheel testing machine having a frame, the spindle drive assembly comprising:
   a spindle having a spindle shaft joined to a spindle hub, the spindle hub being adapted to support a wheel for rotation about a spindle axis;
   a support member movably joined to the frame to pivot the spindle about an axis substantially perpendicular to the spindle axis;
   a drive motor mounted to the support member to move therewith, the drive motor having a motor shaft to rotate the wheel about the spindle axis and a portion that intersects with the axis substantially perpendicular to the spindle axis; and
   a coupling assembly operably coupling the motor shaft to the spindle hub, the coupling assembly including a fastener to selectively decouple the motor shaft from the spindle hub to allow free rotation of the spindle hub, while the drive motor is mounted to the support member.

14. The spindle drive assembly of claim 13 wherein the coupling assembly includes a torque cell.

15. The spindle drive assembly of claim 14 wherein the fastener decouples the torque cell.

16. The spindle drive assembly of claim 15 wherein the spindle shaft is operably couplable to a first end of the torque cell and the motor shaft is operably coupled to a second end of the torque cell.

17. The spindle drive assembly of claim 16 wherein the fastener selectively couples the spindle shaft to the torque cell.

18. The spindle drive assembly of claim 17 wherein the torque cell includes a bore and the spindle shaft extends through the bore such that a distal end of the spindle shaft remote from the spindle hub is selectively coupled to the first end of the torque cell by the fastener.

19. The spindle drive assembly of claim 18 wherein the coupling assembly includes a drive member operably coupled to a second end of the torque cell remote from the fastener, the drive member having a bore through which the spindle shaft extends and can freely rotate therein.

20. A spindle drive assembly for a tire or wheel testing machine having a frame, the spindle drive assembly comprising:
   a spindle having a spindle shaft joined to a spindle hub, the spindle hub being adapted to support a wheel for rotation about a spindle axis;

a support member movably joined to the frame to pivot the spindle about an axis substantially perpendicular to the spindle axis;

a drive motor mounted to the support member to move therewith, the drive motor having a motor shaft to rotate the wheel about the spindle axis; and a coupling assembly operably coupling the motor shaft to the spindle shaft, the coupling assembly including a torque cell having a bore, wherein the spindle shaft extends through the bore such that a distal end of the spindle shaft remote from the spindle hub is joined to a first end of the torque cell, and wherein a second end of the torque cell is operably coupled to the drive motor.

21. The spindle drive assembly of claim 20 wherein the coupling assembly includes a drive member operably coupled to a second end of the torque cell remote from the fastener, the drive member having a bore through which the spindle shaft extends.

22. The spindle drive assembly of claim 21 wherein the drive motor is supported by the support member so that the motor axis intersects to form an acute angle with a spindle plane having the spindle axis that is perpendicular to a hub plane defined by the spindle hub.

23. The spindle drive assembly of claim 21 wherein the support member supports the motor so that the motor axis is oriented vectorially 180 degrees with respect to the spindle axis.

24. A method of operating a spindle drive assembly for a tire or wheel testing machine, the method comprising:

providing a frame, a spindle having a spindle shaft joined to a spindle hub, the spindle hub being adapted to support a wheel for rotation about a spindle axis, a support member movably joined to the frame to pivot the spindle about an axis substantially perpendicular to the spindle axis, a drive motor having a motor shaft to rotate the wheel about the spindle axis, wherein the motor shaft rotates about a motor axis and wherein the drive motor is supported by the support member so that the motor axis forms an angle with a spindle plane having the spindle axis that is perpendicular to a hub plane defined by the spindle hub, wherein the angle is one of acute, perpendicular or obtuse; and selectively decoupling the motor shaft from the spindle hub to Callow free rotation of the spindle hub, while the drive motor is mounted to the support member.

25. The method of operating the spindle drive assembly of claim 24 wherein the step of selectively decoupling includes selectively decoupling the motor shaft from the spindle shaft to allow free rotation of the spindle shaft with the spindle hub.

26. The method of operating the spindle drive assembly of claim 24 wherein the step of providing includes providing a torque cell having a bore wherein the spindle shaft extends through the bore such that a distal end of the spindle shaft remote from the spindle hub is fastened to the torque cell, and wherein the step of selectively decoupling includes selectively decoupling the torque cell from the distal end of the spindle shaft.

27. The spindle drive assembly of claim 4, wherein the coupling assembly comprises a first gear coupled to the spindle shaft and a second gear coupled to the motor shaft, wherein the first gear is adapted to mate with the second gear.

28. The spindle drive assembly of claim 13, wherein the coupling assembly further comprises a first gear coupled to the spindle shaft and a second gear coupled to the motor shaft, wherein the first gear is adapted to mate with the second gear.

29. The spindle drive assembly of claim 22, wherein the drive member comprises a first gear coupled to the spindle shaft and a second gear coupled to the motor shaft, wherein the first gear is adapted to mate with the second gear.

* * * * *

UNITED STATES PATENT AND TRADEMARK OFFICE
CERTIFICATE OF CORRECTION

PATENT NO.    : 6,584,835 B2
DATED         : July 1, 2003
INVENTOR(S)   : Jenniges et al.

It is certified that error appears in the above-identified patent and that said Letters Patent is hereby corrected as shown below:

<u>Column 5,</u>
Line 47, "not" should be -- motor --.
Line 60, "claim 1" should be -- claim 11 --.

<u>Column 8,</u>
Line 8, "Callow" should be -- allow --.

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,584,835 B2
DATED         : July 1, 2003
INVENTOR(S)   : Jenniges et al.

It is certified that error appears in the above-identified patent and that said Letters Patent is hereby corrected as shown below:

Column 5,
Line 47, "not" should be -- motor --.
Line 60, "claim 1" should be -- claim 11 --.

Column 8,
Line 8, "Callow" should be -- allow --.

Signed and Sealed this

Seventeenth Day of February, 2004

JON W. DUDAS
*Acting Director of the United States Patent and Trademark Office*